United States Patent
Matsuo

(10) Patent No.: US 11,577,403 B2
(45) Date of Patent: Feb. 14, 2023

(54) POSITION CORRECTION DEVICE, ROBOT, AND CONNECTION JIG

(71) Applicant: DAI-ICHI SEIKO CO., LTD., Kyoto (JP)

(72) Inventor: Shogo Matsuo, Machida (JP)

(73) Assignee: DAI-ICHI SEIKO CO., LTD., Kyoto (JP)

(*) Notice: Subject to any disclaimer, the term of this patent is extended or adjusted under 35 U.S.C. 154(b) by 773 days.

(21) Appl. No.: 16/390,792

(22) Filed: Apr. 22, 2019

(65) Prior Publication Data
US 2019/0329424 A1    Oct. 31, 2019

(30) Foreign Application Priority Data

Apr. 27, 2018  (JP) .............................. JP2018-086143

(51) Int. Cl.
*B25J 13/08*    (2006.01)
*B25J 17/02*    (2006.01)

(52) U.S. Cl.
CPC ........... *B25J 13/089* (2013.01); *B25J 13/085* (2013.01); *B25J 17/0283* (2013.01)

(58) Field of Classification Search
CPC .... B25J 13/089; B25J 13/085; B25J 17/0283; B23Q 1/00; B23Q 1/012; B23Q 1/52;
(Continued)

(56) References Cited

U.S. PATENT DOCUMENTS 4,874,998 A * 10/1989  Hollis, Jr. ........... F16C 32/0444
                                                                901/29
8,240,971 B2 *  8/2012  Sandmeier ............... B25J 9/041
                                                                414/744.5
(Continued)

FOREIGN PATENT DOCUMENTS

CN      105216007 A  *  1/2016
CN      105216007 A     1/2016
(Continued)

OTHER PUBLICATIONS

English Translation of JP-2006032048-A, Accessed May 11, 2022.*
English Translation of CN-105216007-A, Accessed May 11, 2022.*

*Primary Examiner* — Jeff A Burke
*Assistant Examiner* — Blake A Wood
(74) *Attorney, Agent, or Firm* — Oblon, McClelland, Maier & Neustadt, L.L.P.

(57) ABSTRACT

A position correction device according to an embodiment includes a movable part and a pressing part. The movable part is capable of moving a holding part that holds a connection object back and forth in each of a second direction that is orthogonal to a first direction where the holding part is moved therein in order to connect the connection object to a target connector, and a rotational direction where the holding part is rotated therein around an axis along a third direction that is orthogonal to each of the first direction and the second direction as a center. The pressing part presses the movable part that moves in the second direction to move the movable part to a neutral position in the second direction and presses the movable part that moves in the rotational direction to move the movable part to a neutral position in the rotational direction.

8 Claims, 12 Drawing Sheets

(58) Field of Classification Search
CPC .. B23Q 1/5456; B23Q 1/5462; B23Q 1/5468; B23Q 1/5481; B23Q 1/621; B23Q 1/626; B23Q 3/15573; B23Q 5/22; B23Q 7/04; B23Q 7/14; B23Q 7/043; B23Q 7/1405; B23Q 7/003; B23Q 7/16; B23Q 11/0014; B23Q 37/00

See application file for complete search history.

(56) References Cited

U.S. PATENT DOCUMENTS

| | | | |
|---|---|---|---|
| 10,583,570 B2 * | 3/2020 | Ogata | B25J 19/063 |
| 2012/0205931 A1 * | 8/2012 | Ohta | G01L 5/226 |
| | | | 294/213 |
| 2013/0160508 A1 * | 6/2013 | Fischereder | B21D 43/26 |
| | | | 72/6.1 |

FOREIGN PATENT DOCUMENTS

| | | | |
|---|---|---|---|
| JP | 62-121094 U | | 7/1987 |
| JP | 4-294939 A | | 10/1992 |
| JP | 7-75986 A | | 3/1995 |
| JP | 2006-32048 A | | 2/2006 |
| JP | 2006032048 A | * | 2/2006 |
| JP | 2011-245595 A | | 12/2011 |
| KR | 20-01 39907 Y1 | | 5/1999 |

* cited by examiner

POSITION CORRECTION DEVICE, ROBOT, AND CONNECTION JIG

CROSS-REFERENCE TO RELATED APPLICATION(S)

This application is based upon, and claims the benefit of priority to, Japanese Patent Application No. 2018-086143 filed on Apr. 27, 2018, the entire contents of which are herein incorporated by reference.

BACKGROUND OF THE INVENTION

1. Field of the Invention

A disclosed embodiment relates to a position correction device, a robot, and a connection jig.

2. Description of the Related Art

A manufacturing process for an electrical instrument or the like may include a process of connecting a connection object such as an electrical connector or a plate-shaped wiring member to a target connector, where automation of such a process is advanced by a robot in recent years. For example, a technique has been known for mounting a holding part that holds a connection object on a distal end of an arm of a robot and controlling the arm of the robot to connect the connection object to a target connector.

As there is an error in alignment between a target connector and a connection object when the connection object is connected to the target connector, it may be impossible to connect the connection object to the target connector. Hence, a technique has been proposed for providing a position correction device between an arm of a robot and a holding part that holds a connection object so that such a position correction device corrects an error in alignment between a target connector and the connection object.

For example, a position correction device in Japanese Utility Model Application Publication No. S62-121094 corrects an error in alignment in a state where one housing that is fixed on a gripper that grips a work floats above the other housing that is fixed on an arm due to a repulsion force between a permanent magnet and an electromagnet. Furthermore, such a position correction device causes one housing to mate with the other housing due to an attraction force between a permanent magnet and an electromagnet to restore a position of the one housing.

However, a technique as described in Japanese Utility Model Application Publication No. S62-121094 is merely to correct an error in alignment in a direction that is orthogonal to a direction where a gripper that grips a work moves therein, so that it may be impossible to correct an error in alignment in a rotational direction around an axis along a moving direction as a center accurately.

SUMMARY OF THE INVENTION

A position correction device according to an aspect of an embodiment includes a movable part and a pressing part. The movable part is capable of moving a holding part that holds a connection object back and forth in each of a second direction that is orthogonal to a first direction that is a direction where the holding part is moved therein in order to connect the connection object to a target connector, and a rotational direction that is a direction where the holding part is rotated therein around an axis along a third direction that is orthogonal to each of the first direction and the second direction as a center. The pressing part presses the movable part that moves in the second direction to move the movable part to a neutral position in the second direction and presses the movable part that moves in the rotational direction to move the movable part to a neutral position in the rotational direction.

BRIEF DESCRIPTION OF THE DRAWING(S)

DETAILED DESCRIPTION OF THE PREFERRED EMBODIMENT(S)

Hereinafter, an embodiment(s) of a position correction device, a robot, and a connection jig as disclosed in the present application will be explained in detail with reference to the accompanying drawing(s). Additionally, this invention is not limited by an embodiment(s) as illustrated below.

1. Configuration of Assembly System

Figure 1:
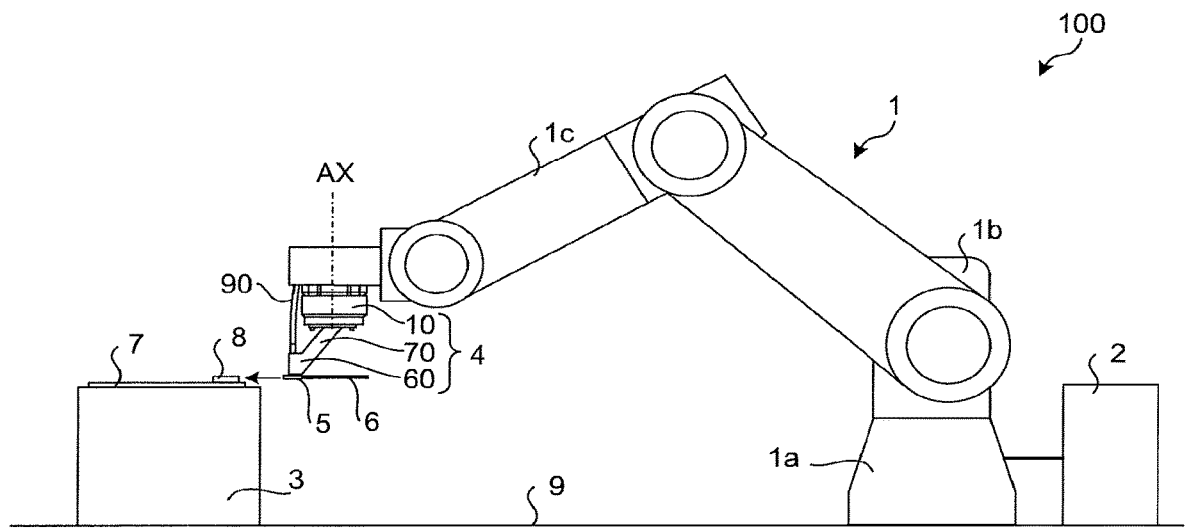
FIG. 1 is a diagram illustrating a configuration example of an assembly system according to an embodiment.

An assembly system that includes a connection jig according to an embodiment will be explained with reference to FIG. 1. As illustrated in FIG. 1, an assembly system 100 according to an embodiment includes a robot 1, a control device 2, a workbench 3, and a connection jig 4.

The robot 1 is an industrial robot and includes a base part 1a with a proximal end that is fixed on an installation surface 9 such as floor, a turning part 1b with a proximal end that is attached to a distal end of the base part 1a so as to be rotatable around a turning axis as a center, and an arm 1c with a proximal end that is attached to a distal end of the turning part 1b so as to be rotatable. The arm 1c includes a plurality of links that are each rotatable around mutually different rotation axes as centers.

The robot 1 includes a non-illustrated motor that rotates the turning part 1b around a turning axis as a center. Furthermore, the robot 1 includes a non-illustrated motor that rotates a link of the arm 1c around a rotation axis as a center, for each rotation axis. Each motor that is provided to the robot 1 is controlled by the control device 2. Additionally, the robot 1 is, for example, a 6-axis robot and may be a 7-or-more-axis robot or a 5-or-less-axis robot. Furthermore, the robot 1 may be configured to include the connection jig 4.

A proximal end of the connection jig 4 is fixed on a distal end of the arm 1c. The connection jig 4 includes a position correction part 10 with an end that is fixed on a distal end of the arm 1c, a holding part 60 that holds a connection object 5, and a joining part 70 that joins the position correction part 10 and the holding part 60. The position correction part 10 is an example of a position correction device.

Although the connection object 5 as illustrated in FIG. 1 is an electrical connector where a cable part 6 that has a plurality of cables is attached thereto, the connection object 5 is not limited to a configuration as illustrated in FIG. 1. For example, the connection object 5 may be a plate-shaped wiring member. A plate-shaped wiring member is, for example, a flexible substrate such as a flexible printed circuit (FPC) and a flexible flat cable (FFC) or a rigid substrate.

A substrate 7 where a target connector 8 is attached thereto is fixed on the workbench 3. The control device 2 preliminarily stores teaching data for causing the robot 1 to execute an operation to connect the connection object 5 to the target connector 8. The control device 2 controls each motor that is provided to the robot 1, based on stored teaching data, so that the connection jig 4 that holds the connection object 5 is moved to connect the connection object 5 to the target connector 8.

Hereinafter, for the purpose of illustration, a direction (a Y-axis positive direction) where the robot 1 moves the holding part 60 therein in order to connect the connection object 5 to the target connector 8 is referred to as a "forward direction" (an example of a first direction) and its opposite direction (a Y-axis negative direction) is referred to as a "backward direction". Furthermore, width directions of the connection object 5 (X-axis directions) are referred to as "leftward and rightward directions" (an example of a second direction) and height directions (Z-axis directions) of the connection object 5 are referred to as "upward and downward directions" (an example of a third direction). Furthermore, a direction where the holding part 60 is rotated therein around an axis AX along upward and downward directions (an example of a third direction) as a center is referred to as a "rotational direction".

The position correction part 10 of the connection jig 4 is capable of moving the holding part 60 back and forth in leftward and rightward directions (X-axis directions) while a neutral position in the leftward and rightward directions (X-axis directions) is a center thereof, and is also capable of moving the holding part 60 back and forth in rotational directions while a neutral position in the rotational directions is a center thereof. Hence, in a case where there is an error in alignment that is executed by teaching data, that is, an error in alignment of the connection object 5 that is moved by the robot 1 with the target connector 8, it is possible to move the holding part 60 in at least one of leftward and rightward directions (X-axis directions) and rotational directions. Therefore, it is possible to correct an error in alignment that is executed by teaching data accurately.

2. Configuration of Connection Jig 4

Figure 2:
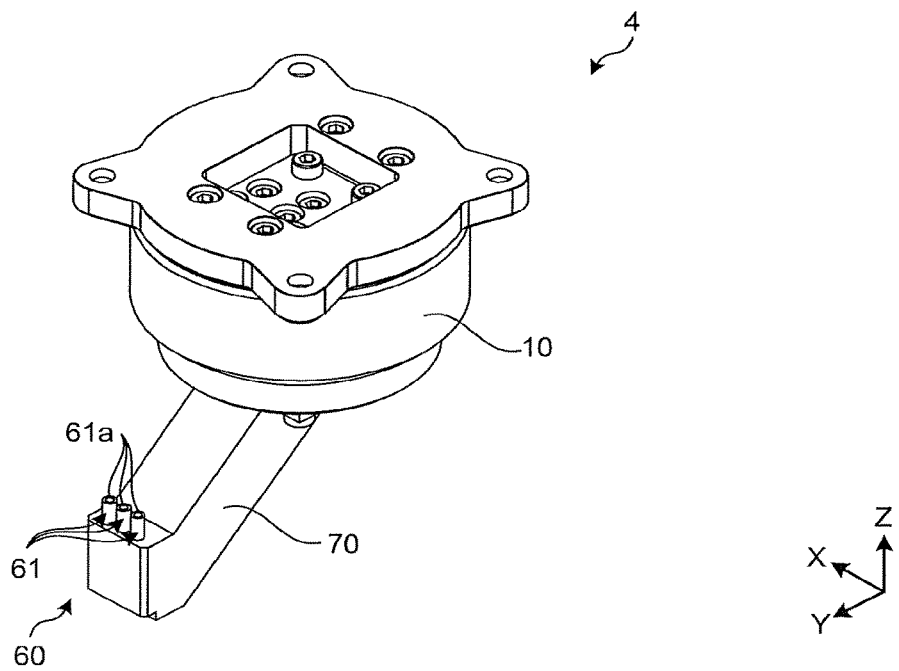
FIG. 2 is an appearance perspective view of a connection jig according to an embodiment.

Hereinafter, a configuration of the connection jig 4 will be explained specifically. As illustrated in FIG. 2, the connection jig 4 includes the position correction part 10, the holding part 60, and the joining part 70.

Figure 3:
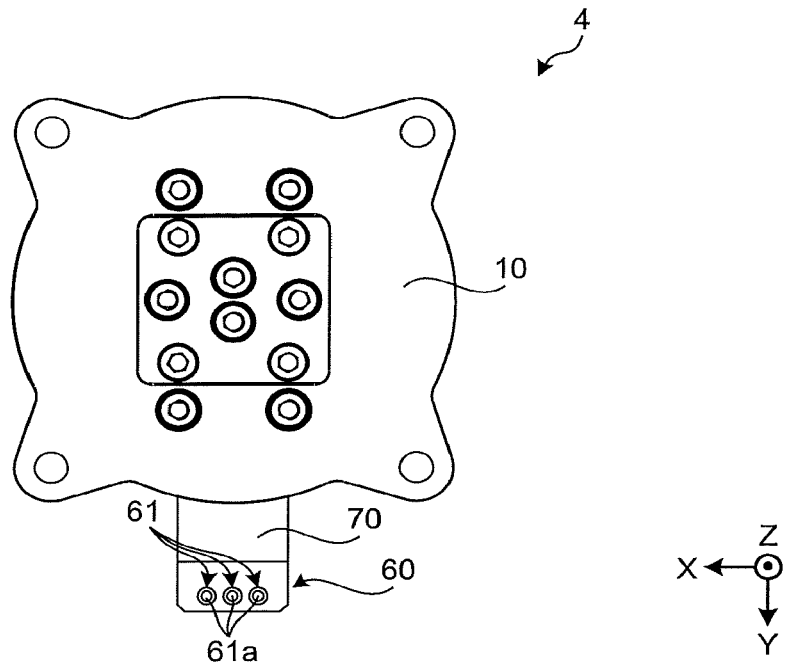
FIG. 3 is a plan view of a connection jig according to an embodiment.
Figure 4:
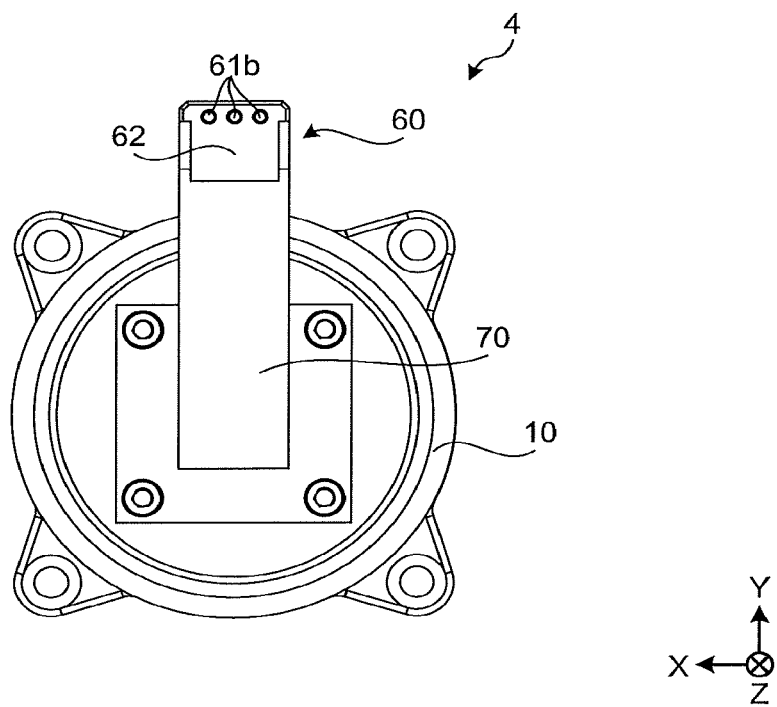
FIG. 4 is a bottom view of a connection jig according to an embodiment.

As illustrated in FIG. 2 to FIG. 4, the holding part 60 has a plurality of connection pipes 61 where a suction tube 90 (see FIG. 1) is attached to an end of each thereof. The connection pipe 61 is provided with one end where an opening 61a is formed thereon and the other end where an opening 61b is formed thereon. Furthermore, as illustrated in FIG. 4, the holding part 60 has an adsorption region 62 where the connection object 5 is adsorbed thereon.

Figure 5:
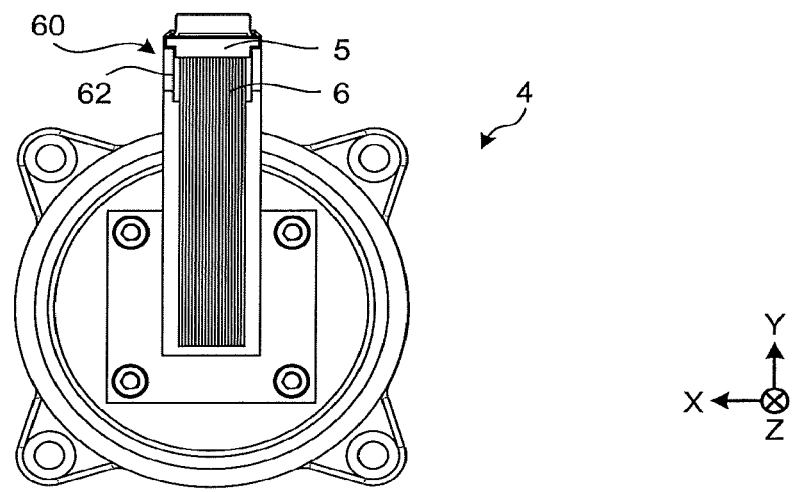
FIG. 5 is a bottom view of a connection jig that holds a connection object according to an embodiment.

In the adsorption region 62, the opening 61b on the other end of each connection pipe 61 is exposed as an adsorption port. As illustrated in FIG. 5, the connection object 5 is adsorbed onto the adsorption region 62 by means of suction that uses the suction tube 90. Additionally, the holding part 60 is not limited to a configuration to adsorb the connection object 5 and thereby hold the connection object 5. For example, the holding part 60 may be configured to grip the connection object 5 and thereby hold the connection object 5.

The joining part 70 is provided with a proximal end (one end) that is fixed on the position correction part 10 and a distal end (the other end) that is fixed on the holding part 60. The joining part 70 extends so as to tilt forward from a proximal end to a distal end thereof. Hence, the holding part 60 is arranged at a position that is shifted from that of the position correction part 10 in forward and backward directions (Y-axis directions).

Thereby, for example, as illustrated in FIG. 1, it is possible to arrange the cable part 6 under the position correction part 10 in forward and backward directions (Y-axis directions) and it is possible to prevent the cable part 6 from greatly protruding backward from under the position correction part 10. Hence, for example, it is possible to reduce a possibility for the cable part 6 to contact the arm 1c due to an operation of the arm 1c.

The position correction part 10 is arranged between a distal end of the arm 1c and the holding part 60 via the joining part 70. Hence, it is possible for the position correction part 10 to move the holding part 60 in leftward and rightward directions (X-axis directions) in a case where a force in leftward and rightward directions (X-axis directions) acts on the holding part 60, and it is possible to move the holding part 60 in rotational directions in a case where a force in rotational directions acts on the holding part 60.

3. Configuration of Position Correction Part 10

Figure 6:
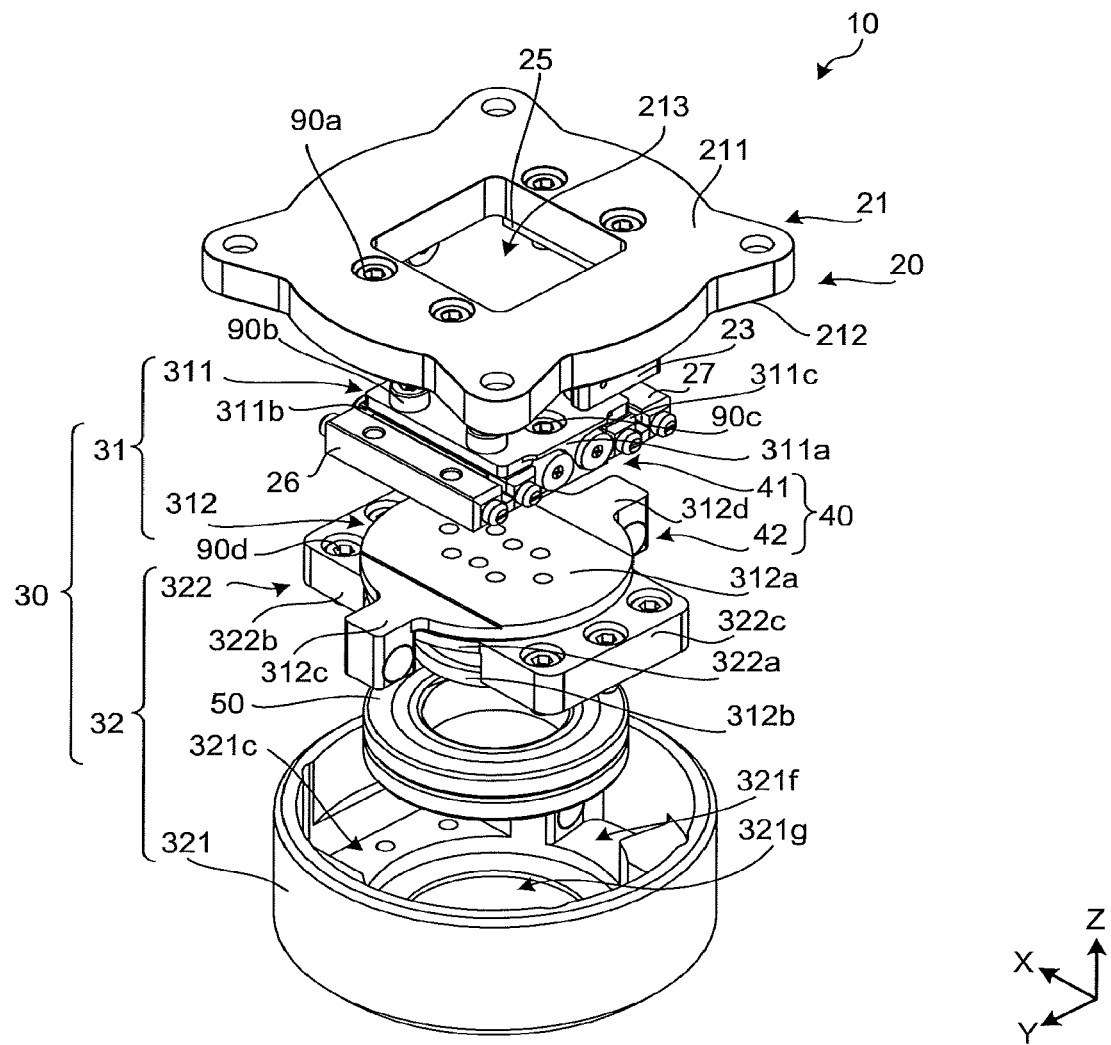
FIG. 6 is an exploded perspective view of a position correction part according to an embodiment.

A configuration of the position correction part 10 will be explained specifically. As illustrated in FIG. 6, the position correction part 10 includes a base part 20, a movable part 30, a pressing part 40, and a bearing 50. The base part 20 is fixed on a distal end of the arm 1c of the robot 1.

Figure 7:
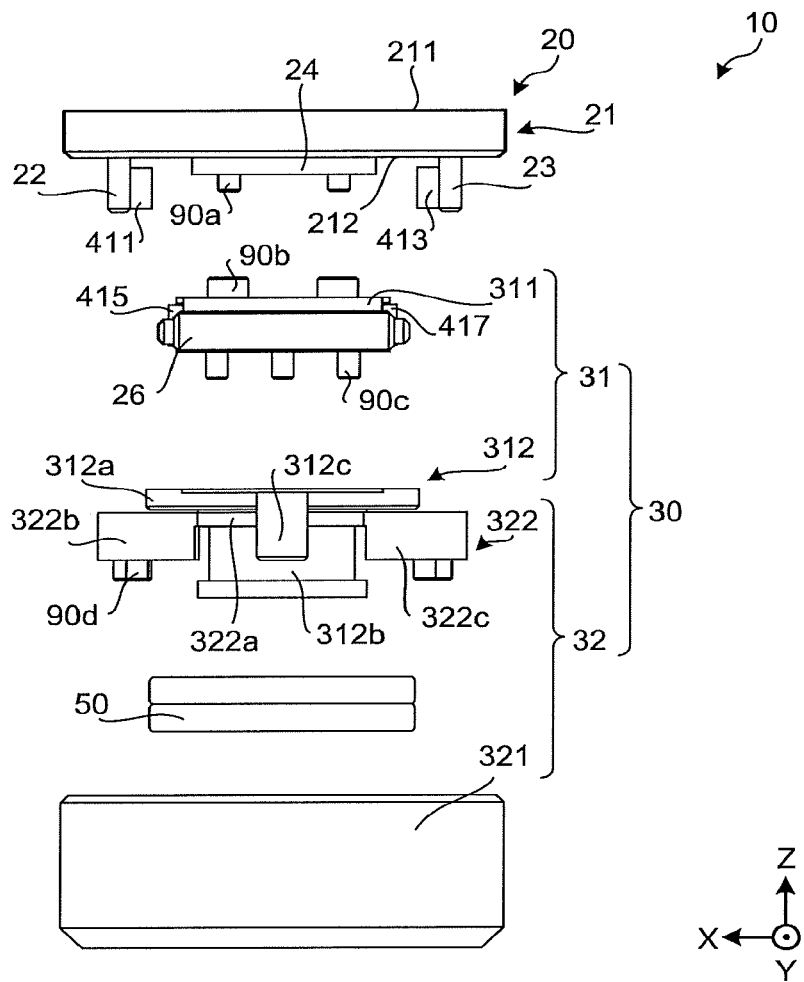
FIG. 7 is an exploded front view of a position correction part according to an embodiment.
Figure 8:
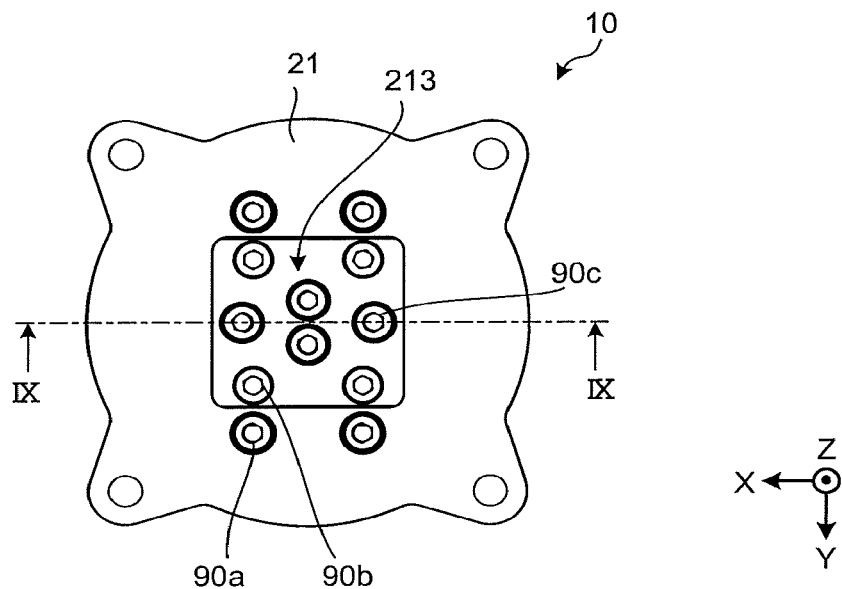
FIG. 8 is a plan view of a position correction part according to an embodiment.

As illustrated in FIG. 6 or FIG. 7, the base part 20 includes a base plate 21 with an upper surface 211 that is attached to a distal end of the arm 1c (see FIG. 1) of the robot 1, a pair of first protrusion parts 22, 23 and a pair of second protrusion parts 24, 25 that protrude downward from a lower surface 212 of the base plate 21, and a pair of guide parts 26, 27 that is fixed on the pair of second protrusion parts 24, 25.

An opening 213 with a square shape is formed at a center of the base plate 21 in a plan view. The pair of first protrusion parts 22, 23 is arranged at mutually opposite positions in leftward and rightward directions (X-axis directions) so as to interpose the opening 213 therebetween. The pair of second protrusion parts 24, 25 is arranged at mutually opposite positions in forward and backward directions (Y-axis directions) so as to interpose the opening 213 therebetween.

The guide part 26 is attached to a bottom of the second protrusion part 24 by a plurality of bolts 90a. Similarly, the guide part 27 is attached to a bottom of the second protrusion part 25 by the plurality of bolts 90a.

As illustrated in FIG. 6, FIG. 7, FIG. 11, and FIG. 14, the movable part 30 includes a slide part 31 and a rotation part 32. The slide part 31 includes a slide body 311 that is arranged between the guide parts 26, 27, and a supporting part 312 that is fixed on a bottom of the slide body 311 by a bolt 90c and supports the rotation part 32 via the bearing 50.

Figure 11:
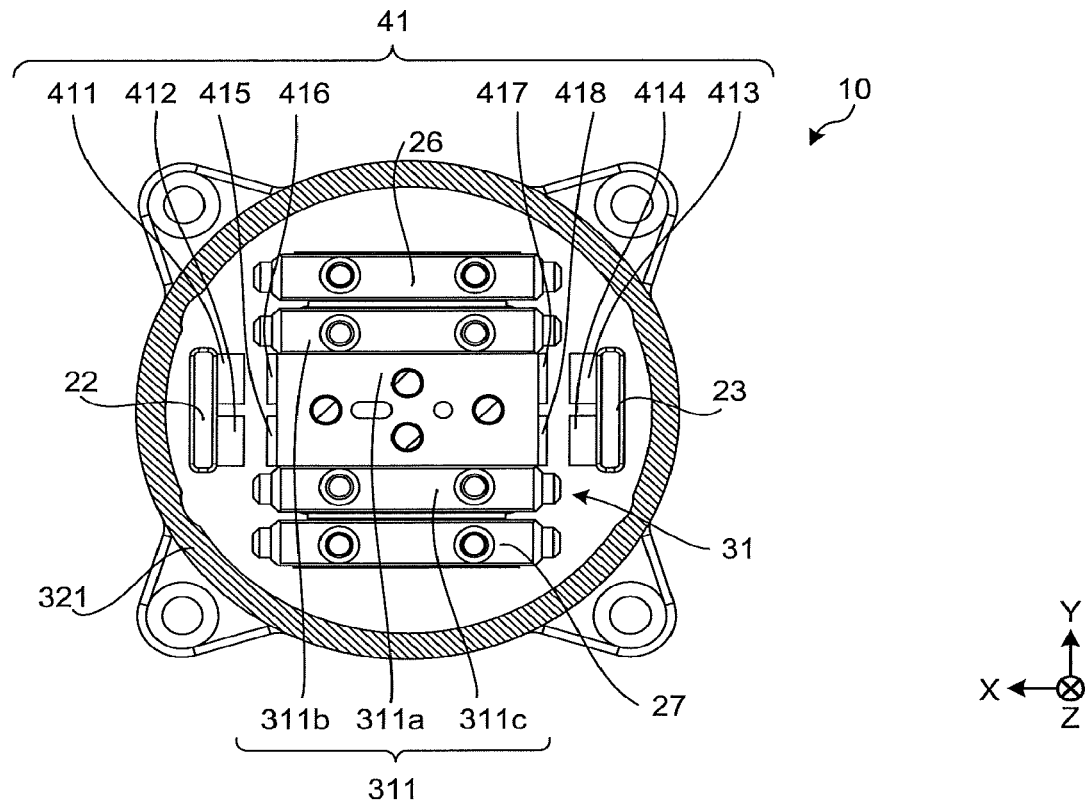
FIG. 11 is a cross-sectional view along line XI-XI as illustrated in FIG. 10.

As illustrated in FIG. 6 and FIG. 11, the slide body 311 is arranged between the pair of guide parts 26, 27. The slide body 311 includes a base part 311a that is formed into a square shape in a plan view, and a pair of rails 311b, 311c that is fixed on the base part 311a by a bolt 90b. The rail 311b is held by the guide part 26 so as to be movable in leftward and rightward directions (X-axis directions) and the rail 311c is held by the guide part 27 so as to be movable in leftward and rightward directions (X-axis directions). Hence, the slide body 311 is movable in leftward and rightward directions (X-axis directions).

Although the rail 311b and the guide part 26 are composed of one cross roller guide, it is sufficient that a configuration is provided in such a manner that the rail 311b is held so as to be movable relative to the guide part 26 in leftward and rightward directions (X-axis directions), and such a cross roller guide is not limiting. For example, the rail 311b and the guide part 26 may be a roller guide other than a cross roller guide, a ball slide guide, or the like. Similarly, although the rail 311c and the guide part 27 are composed of one cross roller guide, such a cross roller guide is not limiting.

Figure 9:
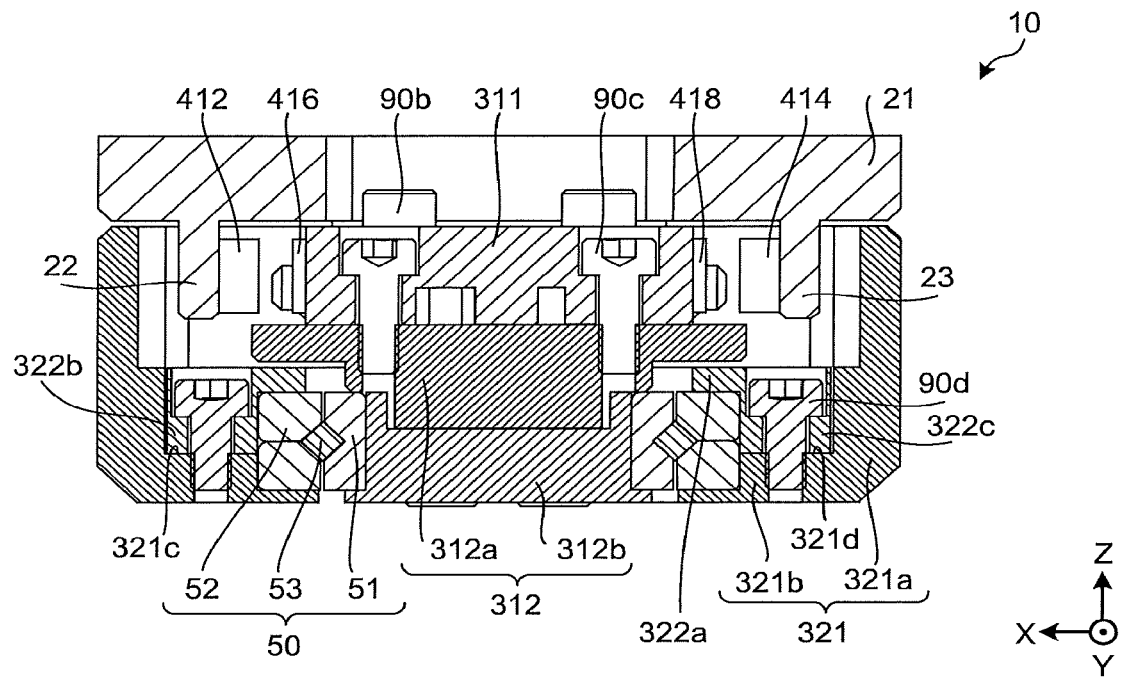
FIG. 9 is a cross-sectional view along line IX-IX as illustrated in FIG. 8.
Figure 10:
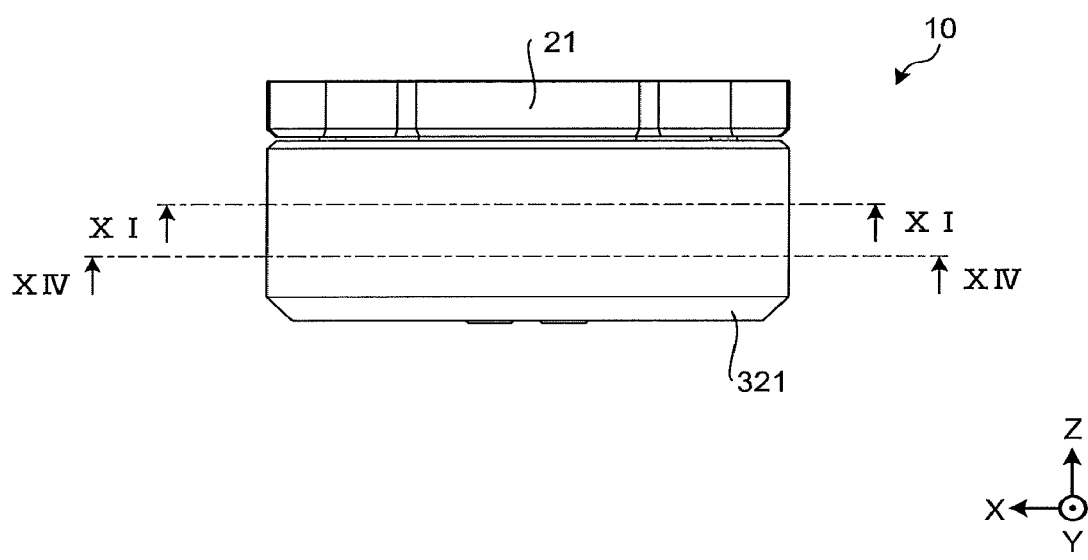
FIG. 10 is a front view of a position correction part according to an embodiment.

As illustrated in FIG. 6, FIG. 7, and FIG. 9, the supporting part 312 has a first cylinder part 312a that has a flange on a top thereof, a second cylinder part 312b that has a flange on a bottom thereof, and protrusion parts 312c, 312d that protrude in a forward direction and a backward direction, respectively, from the top of the first cylinder part 312a.

The rotation part 32 includes a cover 321 and a fixation part 322 and is attached to the slide part 31 via the bearing 50. The bearing 50 has a circular inner ring 51, a circular outer ring 52, and a plurality of cylindrical rollers 53 that enable the outer ring 52 to rotate relative to the inner ring 51.

As illustrated in FIG. 9, the inner ring 51 of the bearing 50 is interposed between, and held by, a flange that is formed on a top of the first cylinder part 312a and a flange that is formed on a bottom of the second cylinder part 312b, so that the bearing 50 is supported by the supporting part 312. Additionally, although the bearing 50 is a cross roller bearing, a ball bearing or another kind of bearing may be provided.

Figure 14:
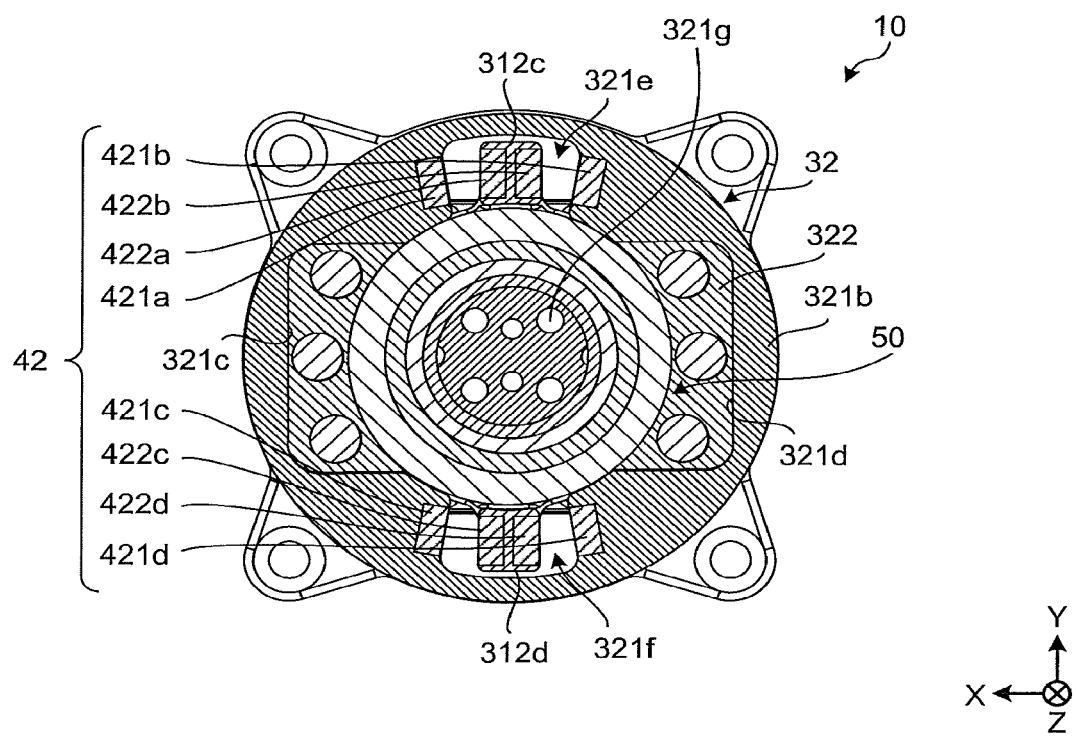
FIG. 14 is a cross-sectional view along line XIV-XIV as illustrated in FIG. 10.

The cover 321 includes a cylindrical peripheral wall part 321a and a bottom part 321b that is continuous with a bottom of the peripheral wall part 321a and has an opening 321g at a center thereof. A pair of first recesses 321c, 321d that is a downward dent is formed on a top of the bottom part 321b at mutually opposite positions in leftward and rightward directions (X-axis directions) so as to interpose the opening 321g therebetween. Furthermore, as illustrated in FIG. 14, a pair of second recesses 321e, 321f that is a downward dent is formed on a top of the bottom part 321b at mutually opposite positions in frontward and backward directions (Y-axis directions) so as to interpose the opening 321g therebetween.

The fixation part 322 includes a circular part 322a that is formed into a circular shape and protrusion parts 322b, 322c that protrude from the circular part 322a in a rightward direction (an X-axis positive direction) and a leftward direction (an X-axis negative direction), respectively. As illustrated in FIG. 9, the protrusion parts 322b, 322c are inserted into the first recesses 321c, 321d that are formed on the cover 321. Then, in a state where the protrusion parts 322b, 322c are inserted into the first recesses 321c, 321d, the cover 321 and the fixation part 322 are fixed by a plurality of bolts 90d.

Thereby, as illustrated in FIG. 9, the outer ring 52 of the bearing 50 is interposed between, and held by, the bottom part 321b of the cover 321 and the circular part 322a of the fixation part 322. Hence, the rotation part 32 is supported by the slide part 31 via the bearing 50 so as to be rotatable in rotational directions.

Thus, in the position correction part 10, the slide part 31 is supported by the base part 20 so as to be movable in leftward and rightward directions (X-axis directions) and the rotation part 32 is supported by the slide part 31 so as to be movable in rotational directions. Then, the holding part 60 is fixed on the cover 321 of the rotation part 32 via the joining part 70. Hence, it is possible for the position correction part 10 to move a position of the holding part 60 in leftward and rightward directions (X-axis directions) and rotational directions.

Additionally, the position correction part 10 is not limited to a configuration as described above. For example, the position correction part 10 may be configured in such a manner that the rotation part 32 is supported by the base part 20 so as to be rotatable and the slide part 31 is supported by the rotation part 32 so as to be movable in leftward and rightward directions (X-axis directions). Furthermore, a configuration may be provided in such a manner that a slide part that is movable in forward and backward directions (Y-axis directions) is further provided in addition to the slide part 31 that is movable in leftward and rightward directions (X-axis directions).

The pressing part 40 presses the movable part 30 that moves in leftward and rightward directions (X-axis directions) so as to move the movable part 30 to a neutral position in leftward and rightward directions (X-axis directions) and presses the movable part 30 that moves in rotational directions so as to move the movable part 30 to a neutral position in rotational directions.

As illustrated in FIG. 6, the pressing part 40 includes a first pressing part 41 that presses the slide part 31 that moves in leftward and rightward directions (X-axis directions) so as to move the slide part 31 to a neutral position in leftward and rightward directions (X-axis directions) and a second pressing part 42 that presses the rotation part 32 that moves in rotational directions so as to move the rotation part 32 to a neutral position in rotational directions.

First, the first pressing part 41 will be explained. As illustrated in FIG. 11, the first pressing part 41 includes a plurality of permanent magnets 415, 416, 417, 418 that are attached to both ends of the slide body 311 of the slide part 31 in leftward and rightward directions (X-axis directions) and a plurality of permanent magnets 411, 412, 413, 414 that are attached to the pair of first protrusion parts 22, 23 of the base part 20 so as to face the permanent magnets 415, 416, 417, 418 in X-axis directions.

The permanent magnet 411 and the permanent magnet 415 are provided with mutually opposite regions in leftward and rightward directions (X-axis directions) that are homopolar with one another, so as to form mutually repulsive magnetic fields. Similarly, the permanent magnet 412 and the permanent magnet 416 are provided with mutually opposite regions in leftward and rightward directions (X-axis directions) that are homopolar with one another, the permanent magnet 413 and the permanent magnet 417 are provided with mutually opposite regions in leftward and rightward directions (X-axis directions) that are homopolar with one another, and the permanent magnet 414 and the permanent magnet 418 are provided with mutually opposite regions in leftward and rightward directions (X-axis directions) that are homopolar with one another.

Therefore, a force acts in a direction where the permanent magnet 411 and the permanent magnet 415 separate from one another therein and a force acts in a direction where the permanent magnet 412 and the permanent magnet 416 separate from one another therein. Furthermore, a force acts in a direction where the permanent magnet 413 and the permanent magnet 417 separate from one another therein and a force acts in a direction where the permanent magnet 414 and the permanent magnet 418 separate from one another therein.

Thereby, the slide part 31 is pressed toward a neutral position within a range of motion thereof in leftward and rightward directions (X-axis directions). Hence, as illustrated in FIG. 11, in a state where a force does not act on the holding part 60, the slide part 31 is maintained at a neutral position within a range of motion thereof in leftward and rightward directions (X-axis directions).

Figure 12:
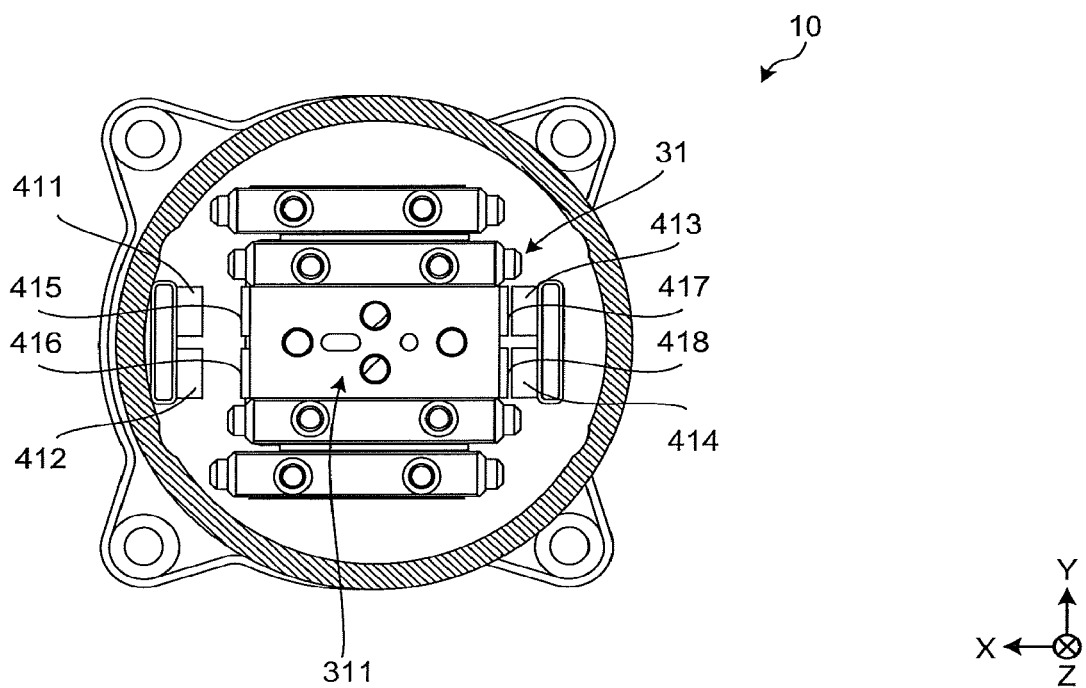
FIG. 12 is a cross-sectional view illustrating a state of movement of a slide part according to an embodiment in leftward and rightward directions.
Figure 13:
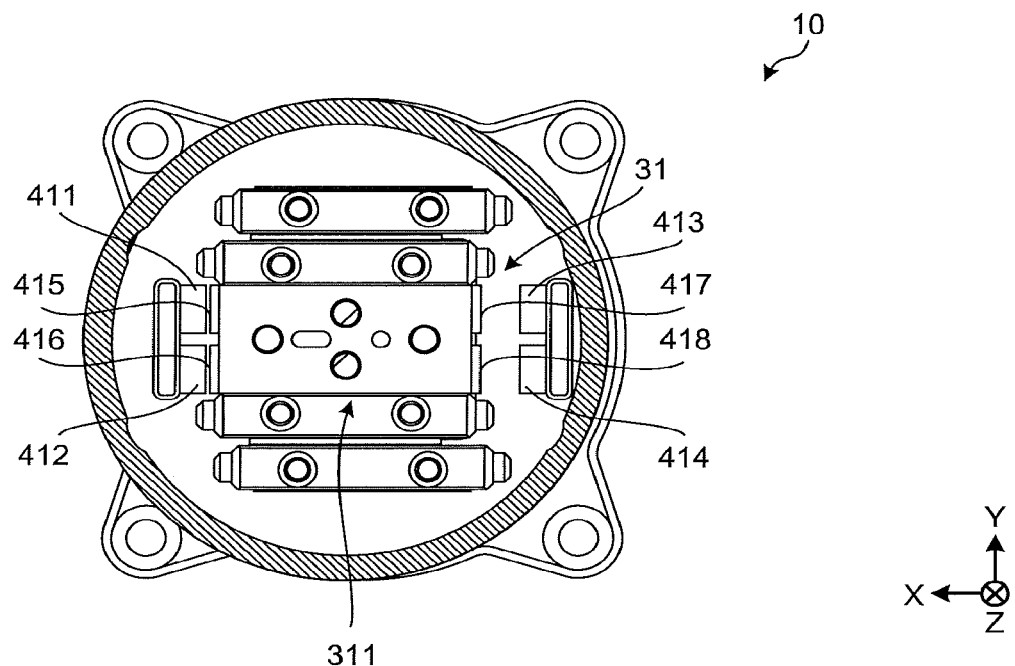
FIG. 13 is a cross-sectional view illustrating a state of movement of a slide part according to an embodiment in leftward and rightward directions.

Furthermore, in a case where a force acts on the holding part 60 in a leftward direction (an X-axis negative direction), the slide part 31 moves in a leftward direction (an X-axis negative direction) as illustrated in FIG. 12 where the position correction part 10 is viewed from a bottom surface side thereof, or in a case where a force acts on the holding part 60 in a rightward direction (an X-axis positive direction), the slide part 31 moves in a rightward direction (an X-axis positive direction) as illustrated in FIG. 13 where the position correction part 10 is viewed from a bottom surface side thereof. Then, in a case where a force that acts on the holding part 60 is lost after the slide part 31 moves in a leftward direction or a rightward direction from a neutral position as illustrated in FIG. 11, the slide part 31 returns to such a neutral position in leftward and rightward directions (X-axis directions) as illustrated in FIG. 11 due to pressing of the first pressing part 41 against the slide part 31 toward the neutral position in leftward and rightward directions (X-axis directions).

Next, the second pressing part 42 will be explained. As illustrated in FIG. 14, the second pressing part 42 includes a plurality of permanent magnets 421*a*, 421*b*, 421*c*, 421*d* that are arranged on the bottom part 321*b* of the cover 321. The permanent magnets 421*a*, 421*b* are arranged at mutually opposite positions so as to interpose the second recess 321*e* on the bottom part 321*b* of the cover 321 therebetween. Furthermore, the permanent magnets 421*c*, 421*d* are arranged at mutually opposite positions so as to interpose the second recess 321*f* on the bottom part 321*b* of the cover 321 therebetween.

Furthermore, the second pressing part 42 includes a plurality of permanent magnets 422*a*, 422*b*, 422*c*, 422*d* that are arranged on the supporting part 312. The permanent magnets 422*a*, 422*b* are arranged at both ends of the protrusion part 312*c* in leftward and rightward directions (X-axis directions) and the permanent magnets 422*c*, 422*d* are arranged at both ends of the protrusion part 312*d* in leftward and rightward directions (X-axis directions). Thereby, the permanent magnets 421*a*, 422*a* face one another, the permanent magnets 421*b*, 422*b* face one another, the permanent magnets 421*c*, 422*c* face one another, and the permanent magnets 421*d*, 422*d* face one another.

The permanent magnet 421*a* and the permanent magnet 422*a* are provided with mutually opposite regions in rotational directions that are homopolar with one another, so as to form mutually repulsive magnetic fields. Similarly, the permanent magnet 421*b* and the permanent magnet 422*b* are provided with mutually opposite regions in rotational directions that are homopolar with one another, the permanent magnet 421*c* and the permanent magnet 422*c* are provided with mutually opposite regions in rotational directions that are homopolar with one another, and the permanent magnet 421*d* and the permanent magnet 422*d* are provided with mutually opposite regions in rotational directions that are homopolar with one another.

Therefore, a force acts in a direction where the permanent magnet 421*a* and the permanent magnet 422*a* separate from one another therein and a force acts in a direction where the permanent magnet 421*b* and the permanent magnet 422*b* separate from one another therein. Furthermore, a force acts in a direction where the permanent magnet 421*c* and the permanent magnet 422*c* separate from one another therein and a force acts in a direction where the permanent magnet 421*d* and the permanent magnet 422*d* separate from one another therein.

Thereby, the rotation part 32 is pressed toward a neutral position within a range of motion thereof in rotational directions. Hence, as illustrated in FIG. 14, in a state where a force does not act on the holding part 60, the rotation part 32 is maintained at a neutral position within a range of motion thereof in rotational directions.

Figure 15:
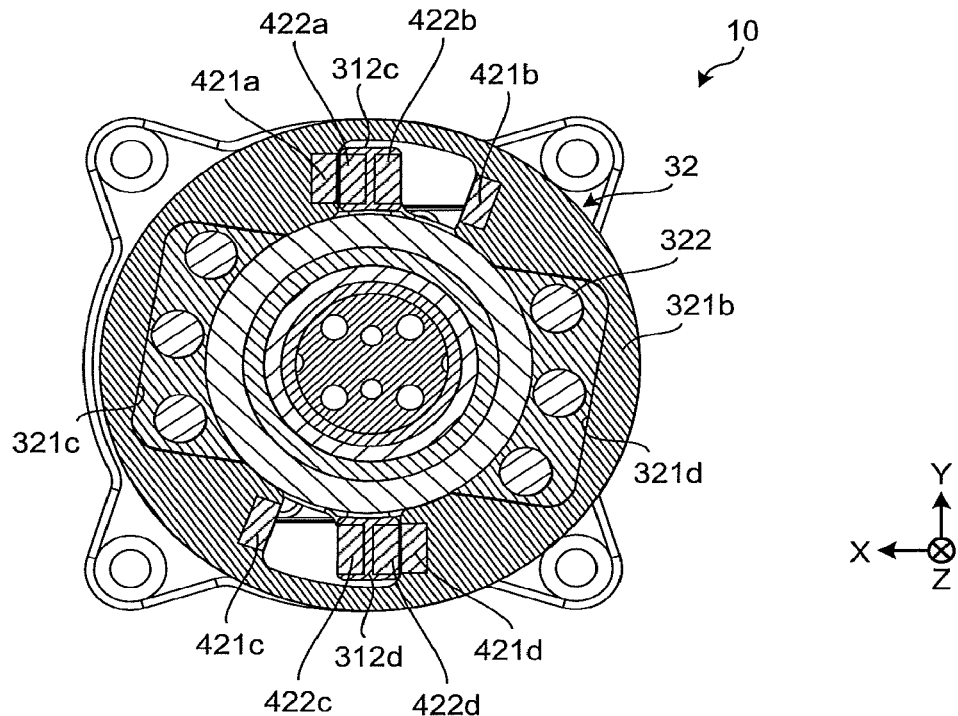
FIG. 15 is a cross-sectional view illustrating a state of movement of a rotation part according to an embodiment in rotational directions.

In a case where a force acts on the holding part 60 in a clockwise direction in a plan view among rotational directions, the rotation part 32 moves in a clockwise direction in a plan view as illustrated in FIG. 15 where the position correction part 10 is viewed from a bottom surface side thereof. Furthermore, in a case where a force acts on the holding part 60 in a counterclockwise direction in a plan view among rotational directions, the rotation part 32 moves in a counterclockwise direction in a plan view as illustrated in FIG. 16 where the position correction part 10 is viewed from a bottom surface side thereof.

Figure 16:
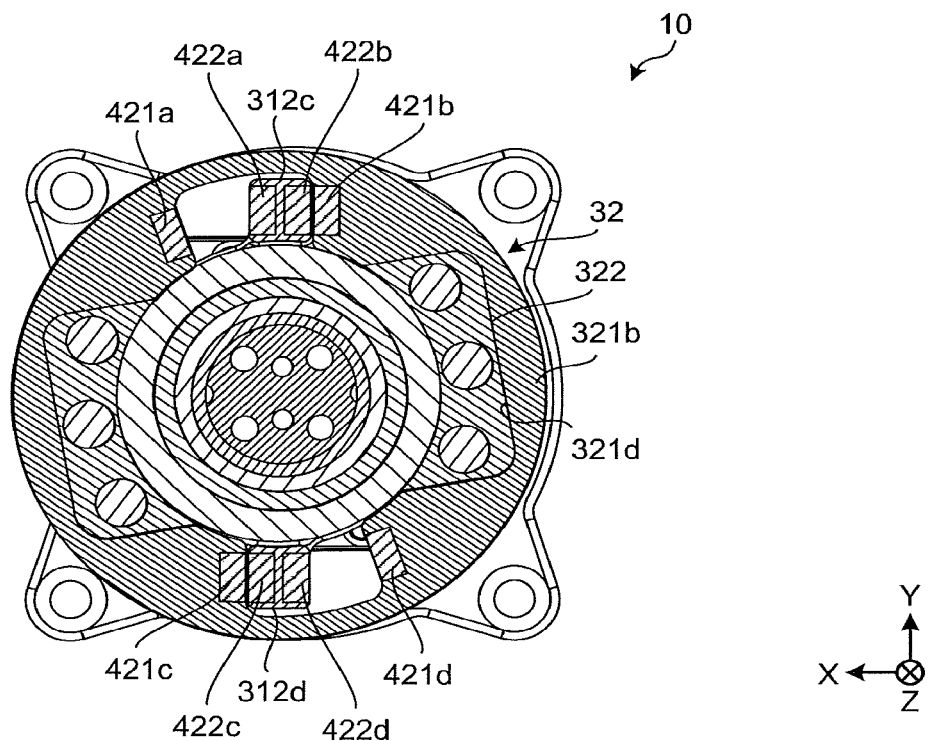
FIG. 16 is a cross-sectional view illustrating a state of movement of a rotation part according to an embodiment in rotational directions.

Then, in a case where a force that acts on the holding part 60 is lost after the rotation part 32 moves to, for example, a position as illustrated in FIG. 15 or FIG. 16 from a neutral position as illustrated in FIG. 14, the rotation part 32 returns to such a neutral position in rotational directions as illustrated in FIG. 14 due to pressing of the second pressing part 42 against the rotation part 32 toward the neutral position in rotational directions.

4. Correction of Error in Alignment by Position Correction Part 10

Next, correction of an error in alignment by the position correction part 10 will be explained. As described above, the connection object 5 is held by the holding part 60 of the connection jig 4. As illustrated in FIG. 1, such a connection jig 4 is attached to a distal end of the arm 1*c* of the robot 1, and the robot 1 is controlled by the control device 2 so as to move the distal end of the arm 1*c*. Thereby, the holding part 60 that holds the connection object 5 is moved.

The holding part 60 is moved toward the target connector 8 by the robot 1 in such a manner that the connection object 5 is connected to the target connector 8 that is attached to the substrate 7, but an error may be caused in alignment between the connection object 5 and the target connector 8 that is executed by teaching data of the robot 1.

For example, as a relative position between the connection object 5 and the adsorption region 62 is moved when the connection object 5 is adsorbed onto the adsorption region 62 of the holding part 60, an error is caused in alignment between the connection object 5 and the target connector 8. Furthermore, as a position for fixation of the substrate 7 on the workbench 3 is moved, an error is caused in alignment between the connection object 5 and the target connector 8.

Figure 17:
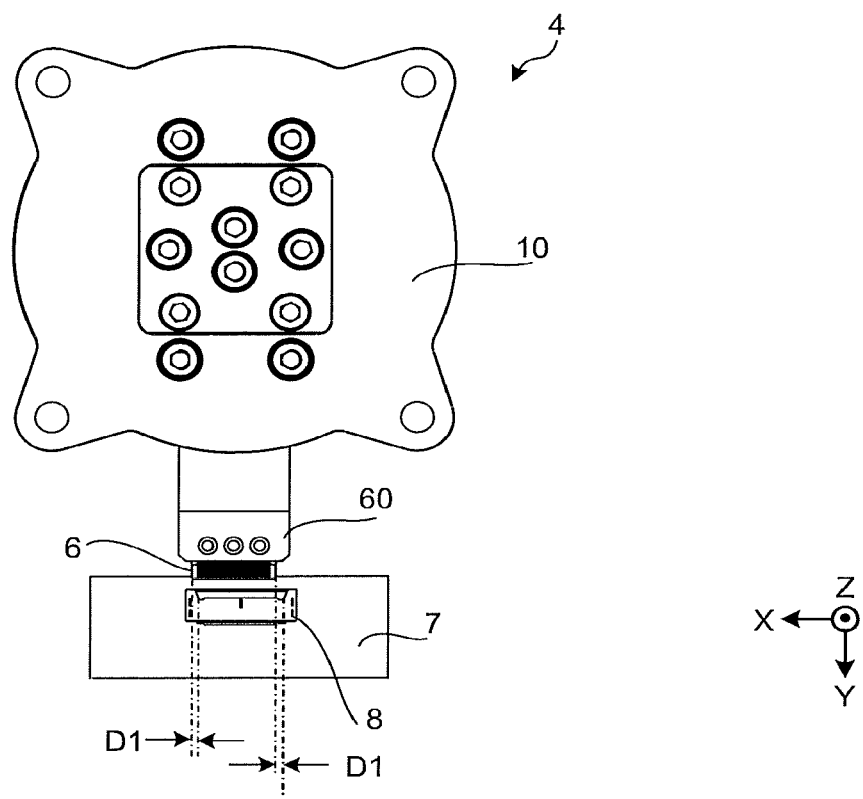
FIG. 17 is an illustration diagram for an operation of correction of an error in alignment in leftward and rightward directions that is executed by a position correction part according to an embodiment.

In an example as illustrated in FIG. 17, an error in a distance D1 in leftward and rightward directions (X-axis directions) is caused in alignment between the connection object 5 and the target connector 8 that is executed by teaching data of the robot 1. As the connection jig 4 is moved forward by the arm 1*c* of the robot 1 from a state as illustrated in FIG. 17, the holding part 60 is moved by a distance D1 in a leftward direction (an X-axis negative direction) due to position correction that is executed by the position correction part 10 when the connection object 5 is connected to the target connector 8.

Figure 18:
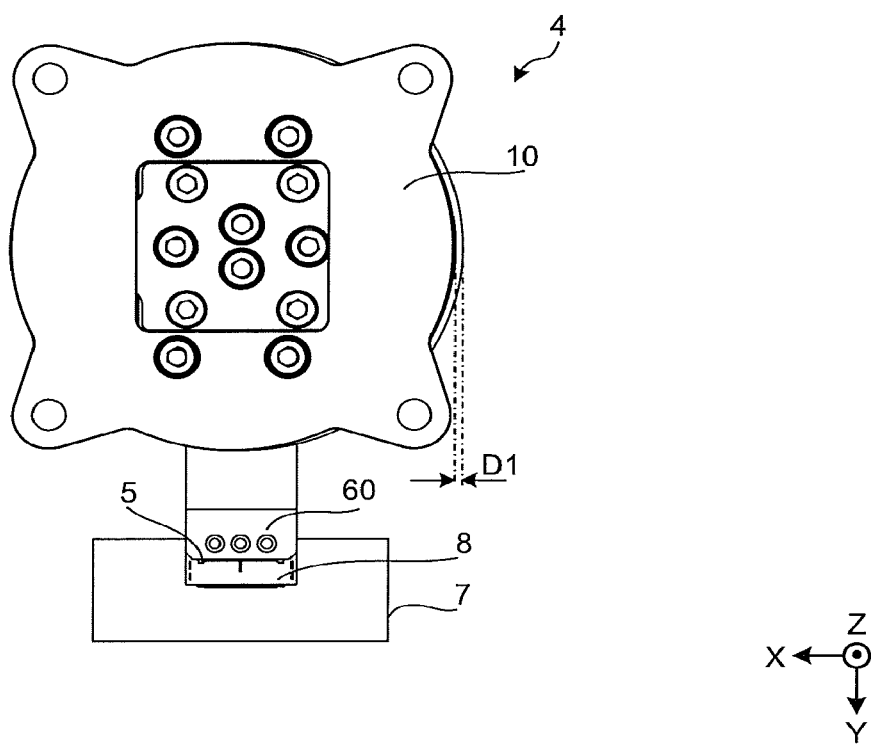
FIG. 18 is an illustration diagram for an operation of correction of an error in alignment in leftward and rightward directions that is executed by a position correction part according to an embodiment.

Hence, even in a case where an error in alignment between the connection object 5 and the target connector 8 is caused in leftward and rightward directions (X-axis directions) as illustrated in FIG. 17, it is possible to connect the connection object 5 to the target connector 8 as illustrated in FIG. 18.

Figure 19:
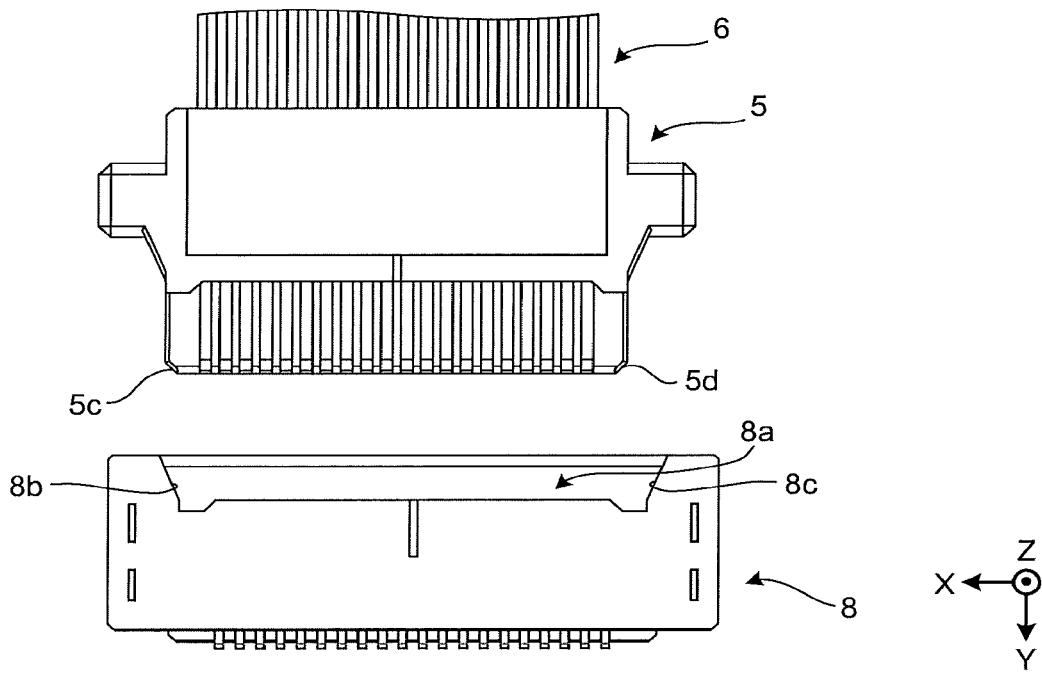
FIG. 19 is an illustration diagram for an operation of correction of an error in alignment in leftward and rightward directions that is executed by a position correction part according to an embodiment.

As illustrated in FIG. 19, the target connector 8 has an opening 8*a* where a tip of the connection object 5 is inserted therein and a pair of tapered guide parts 8*b*, 8*c* that are provided on left and right ends thereof. On sloping surfaces that are possessed by the guide parts 8*b*, 8*c*, a distance between the guide parts 8*b*, 8*c* in leftward and rightward directions (X-axis directions) is reduced in a forward direction.

Hence, in a case where a position of a tip of the connection object 5 is shifted from that of the opening 8*a* in leftward and rightward directions (X-axis directions), one of taper parts 5*c*, 5*d* that are formed on the tip of the connection object 5 contacts a sloping surface of one of the guide parts 8*b*, 8*c*. Then, a force toward one direction among leftward and rightward directions (X-axis directions) acts on one of the taper parts 5*c*, 5*d* of the connection object 5 as the connection object 5 moves forward. As a force toward one direction among leftward and rightward directions (X-axis directions) acts on a tip of the connection object 5, a force in one direction among leftward and rightward directions (X-axis directions) acts on the holding part 60, so that the holding part 60 is moved in one direction among leftward and rightward directions (X-axis directions) by the position correction part 10.

Figure 20:
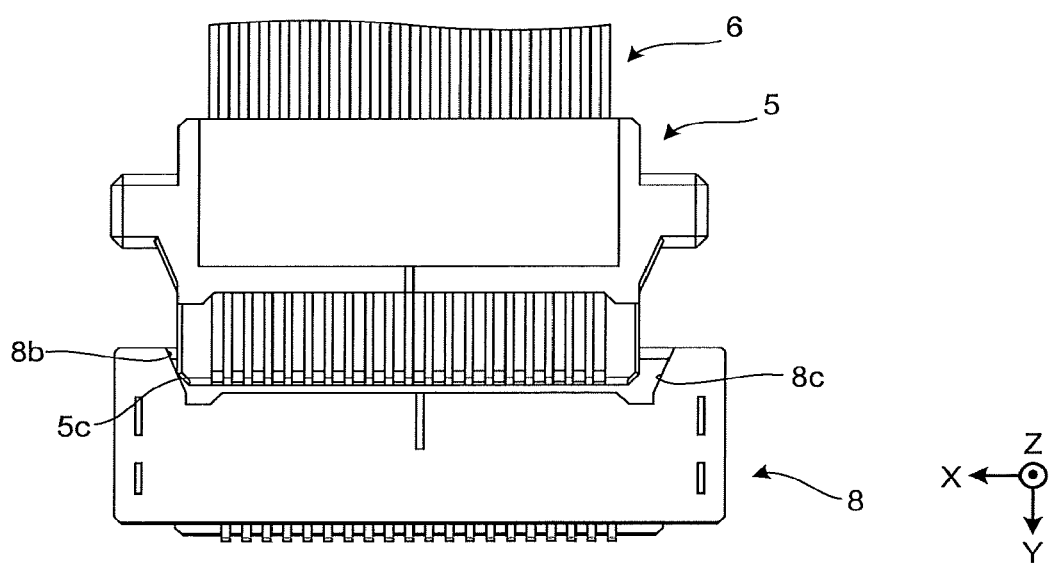
FIG. 20 is an illustration diagram for an operation of correction of an error in alignment in leftward and rightward directions that is executed by a position correction part according to an embodiment.

For example, an example as illustrated in FIG. 20 illustrates a situation where the taper part 5*c* of the connection object 5 contacts a sloping surface of the guide part 8*b* and a force toward a leftward direction (an X-axis negative direction) acts on the holding part 60, so that the holding part 60 is moved in a leftward direction (an X-axis negative direction) by the position correction part 10. Then, as the connection object 5 moves forward (in a Y-axis positive direction), a position of a center of the connection object 5 in leftward and rightward directions (X-axis directions) approaches a position of a center of the opening 8*a* in leftward and rightward directions (X-axis directions).

Thus, it is possible for the position correction part 10 to execute correction of an error in alignment in such a manner that a position of a center of the connection object 5 in leftward and rightward directions (X-axis directions) approaches a position of a center of the opening 8*a* of the target connector 8 in leftward and rightward directions (X-axis directions). Additionally, in FIG. 19 and FIG. 20, leftward and rightward directions (X-axis directions) are width directions of the target connector 8.

Figure 21:
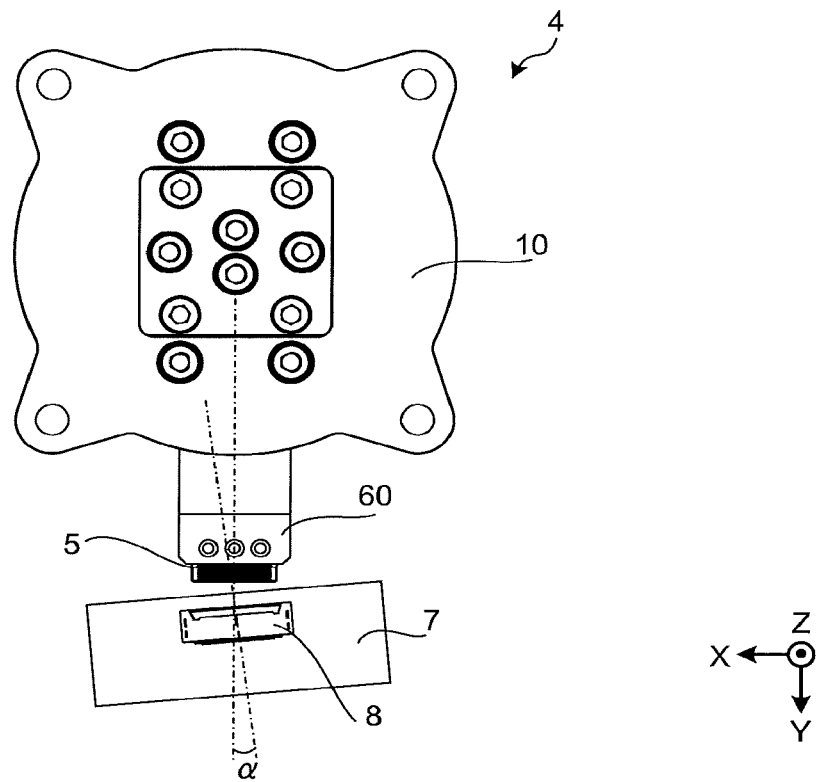
FIG. 21 is an illustration diagram for an operation of correction of an error in alignment in rotational directions that is executed by a position correction part according to an embodiment.

Furthermore, in an example as illustrated in FIG. 21, an error of an α degree(s) in rotational directions is caused in alignment between the connection object 5 and the target connector 8. As the connection jig 4 is moved forward from a state as illustrated in FIG. 21 by the arm 1*c* of the robot 1, the holding part 60 is moved by an α degree(s) in rotational directions due to position correction that is executed by the position correction part 10 when the connection object 5 is connected to the target connector 8.

Figure 22:
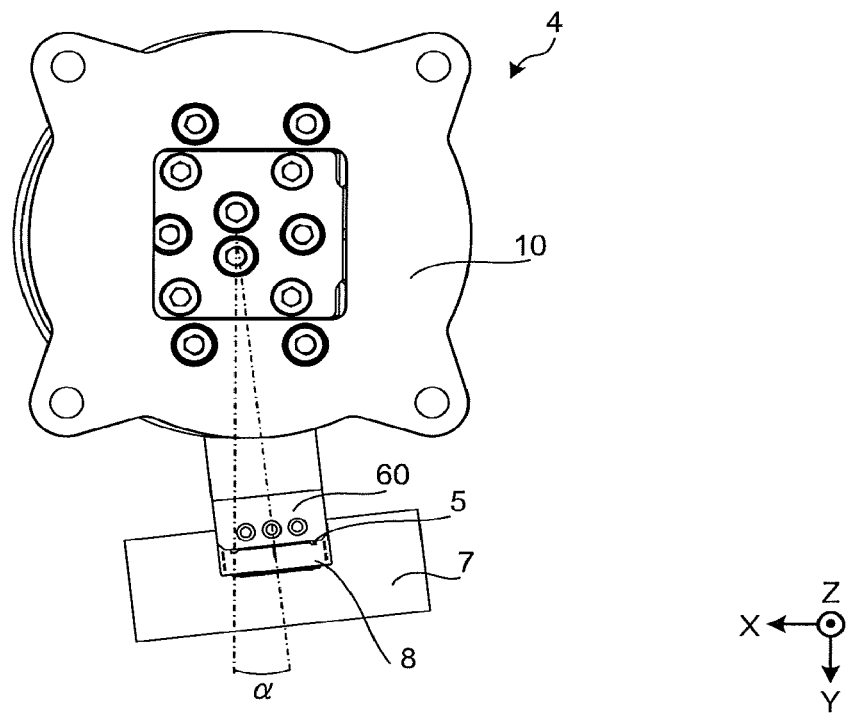
FIG. 22 is an illustration diagram for an operation of correction of an error in alignment in rotational directions that is executed by a position correction part according to an embodiment.

Hence, even in a case where an error in rotational directions is caused in alignment between the connection object 5 and the target connector 8 as illustrated in FIG. 21, it is possible to connect the connection object 5 to the target connector 8 as illustrated in FIG. 22. Additionally, although the connection object 5 is a plug connector and the target connector 8 is a receptacle connector in an example as illustrated in FIG. 17 to FIG. 22, the connection object 5 may be a receptacle connector and the target connector 8 may be a plug connector.

Furthermore, although the first pressing part 41 and the second pressing part 42 are provided in such a manner that opposite regions of permanent magnets are homopolar with one another and opposite permanent magnets form mutually repulsive magnet fields, a configuration may be provided in such a manner that opposite regions of permanent magnets are mutually heteropolar with one another and opposite permanent magnets form mutually attractive magnet fields.

Furthermore, although the position correction part 10 in an example as described above is provided in such a manner that the first pressing part 41 is composed of the plurality of permanent magnets 411 to 418 and the second pressing part 42 is composed of the plurality of permanent magnets 421*a* to 421*d*, 422*a* to 422*d*, the position correction part 10 is not limited to a configuration(s) as described above. For example, one or both of the first pressing part 41 and the second pressing part 42 may be composed of a plurality of elastic bodies.

For example, the first pressing part 41 may be configured to include one or more springs that are provided between the slide body 311 and the first protrusion part 22 and one or more springs that are provided between the slide body 311 and the first protrusion part 23. Furthermore, the second pressing part 42 may be configured to include one or more springs that are provided between the protrusion part 312*c* and the bottom part 321*b* and one or more springs that are provided between the protrusion part 312*d* and the bottom part 321*b*. Furthermore, an elastic body may be a resin or a rubber instead of a spring.

Furthermore, although the connection object 5 in an example as described above is automatically moved by the robot 1, a configuration may be provided in such a manner that the connection object 5 is manually moved by an operator.

Although the connection jig 4 in an example as described above is configured to have the position correction part 10, the holding part 60, and the joining part 70, the connection jig 4 is not limited to a configuration as described above. For example, the connection jig 4 may be configured to further have a detection part that detects whether or not an amount of movement of the holding part 60 that is executed by the position correction part 10 is insufficient.

Figure 23:
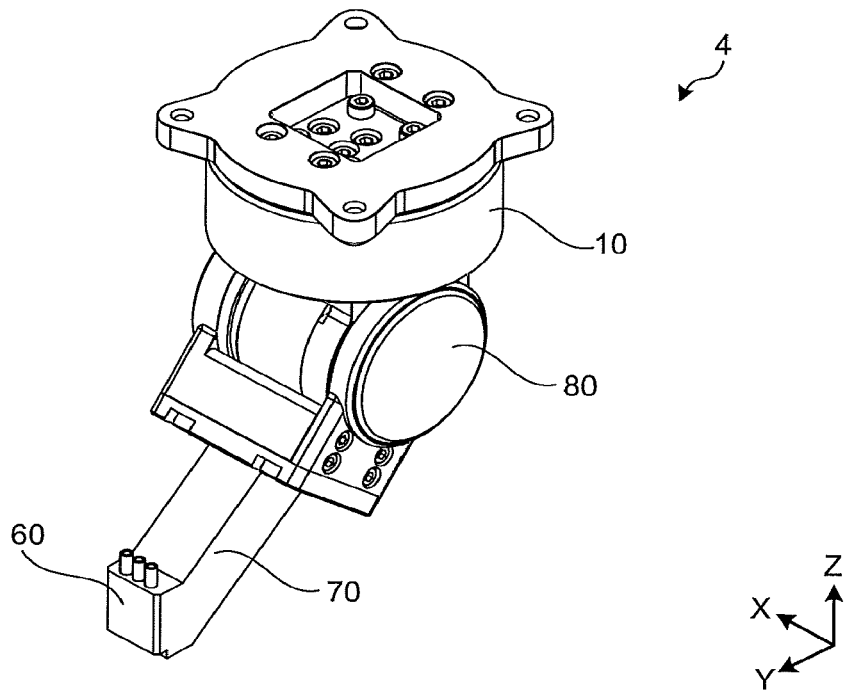
FIG. 23 is an appearance perspective view of a connection jig that has another configuration according to an embodiment.

The connection jig 4 as illustrated in FIG. 23 has the position correction part 10, the holding part 60, the joining part 70, and a detection part 80. The detection part 80 detects whether or not an amount of movement of the holding part 60 in leftward and rightward directions (X-axis directions) that is executed by the position correction part 10 is insufficient, and whether or not an amount of movement of the holding part 60 in rotational directions that is executed by the position correction part 10 is insufficient.

In a case where a range of motion of the holding part 60 in leftward and rightward directions (X-axis directions) that is executed by the position correction part 10 is insufficient in order to connect the connection object 5 to the target connector 8, the detection part 80 detects that an amount of movement of the holding part 60 in leftward and rightward directions (X-axis directions) that is executed by the position correction part 10 is insufficient. Furthermore, in a case where a range of motion of the holding part 60 in rotational directions that is executed by the position correction part 10 is insufficient in order to connect the connection object 5 to the target connector 8, the detection part 80 detects that an amount of movement of the holding part 60 in rotational directions that is executed by the position correction part 10 is insufficient.

The detection part 80 has, for example, a torque sensor 82 (see FIG. 24) that detects a torque in leftward and rightward directions (X-axis directions) and a torque in rotational directions. In a case where a range of motion of the holding part 60 in leftward and rightward directions (X-axis directions) that is executed by the position correction part 10 is insufficient when the connection object 5 is connected to the target connector 8, a torque that is greater than or equal to a threshold in leftward and rightward directions (X-axis directions) is applied to the detection part 80, so that the torque sensor 82 detects the torque that is greater than or equal to a threshold in leftward and rightward directions (X-axis directions). Thereby, it is possible for the detection part 80 to detect that an amount of movement of the holding part 60 in leftward and rightward directions (X-axis directions) that is executed by the position correction part 10 is insufficient.

Similarly, in a case where a range of motion of the holding part 60 in rotational directions that is executed by the position correction part 10 is insufficient when the connection object 5 is connected to the target connector 8, a torque that is greater than or equal to a threshold in rotational directions is applied to the detection part 80, so that such a torque that is greater than or equal to a threshold in rotational directions is generated and the torque sensor 82 detects the torque that is greater than or equal to a threshold in rotational directions. Thereby, it is possible for the detection part 80 to detect that an amount of movement of the holding part 60 in rotational directions that is executed by the position correction part 10 is insufficient.

It is possible for the detection part 80 to output a result of detection of a torque that is executed by the torque sensor 82 to the control device 2. In a case where the detection part 80 detects that an amount of movement of the holding part 60 that is executed by the position correction part 10 is insufficient, it is possible for the control device 2 to execute a correction process of correcting stored teaching data. Thereby, it is possible to reduce an error in alignment that is caused by teaching data.

Figure 24:
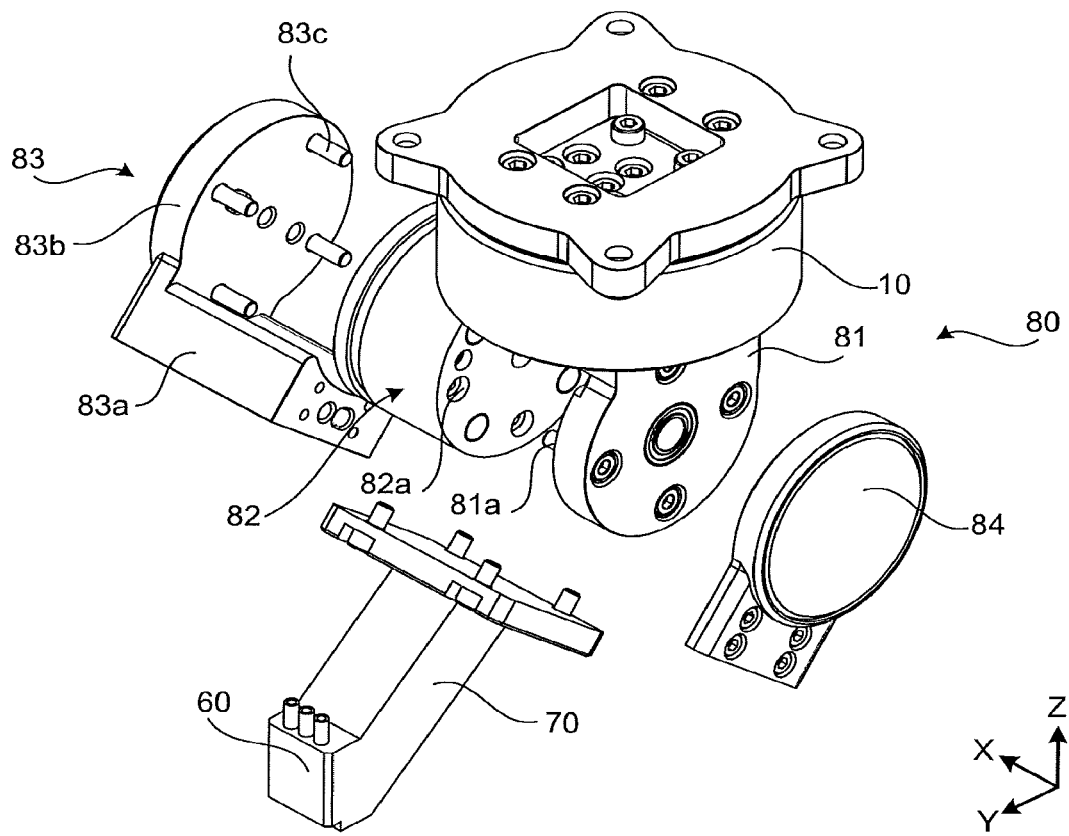
FIG. 24 is a partial exploded perspective view of a connection jig as illustrated in FIG. 23.

As illustrated in FIG. 24, the detection part 80 includes a base part 81 that is supported by the position correction part 10 so as to be movable in leftward and rightward directions (X-axis directions) and rotational directions, a cylindrical torque sensor 82, a first case part 83 with a bottom 83*a* that is connected to the joining part 70 and a top 83*b* that faces the base part 81 in leftward and rightward directions (X-axis directions), and a second case part 84 that faces the base part 81 in leftward and rightward directions (X-axis directions).

A plurality of insertion holes 82*a* are formed on the torque sensor 82. A plurality of cylindrical protrusion pins 81*a* that are formed on the base part 81 and a plurality of cylindrical protrusion pins 83*c* that are formed on the first case part 83 are inserted into the plurality of insertion holes 82*a*. For example, it is possible for the torque sensor 82 to detect forces that are applied in leftward and rightward directions (X-axis directions) and rotational directions, based on forces that act on the plurality of protrusion pins 83*c* or the plurality of protrusion pins 81*a*. Additionally, the detection part 80 is not limited to a configuration as illustrated in FIG. 24 as long as a configuration is provided so as to detect whether or not an amount of movement of the holding part 60 that is executed by the position correction part 10 is insufficient.

As provided above, the position correction part 10 according to an embodiment (an example of a position correction device) includes the movable part 30 and the pressing part 40. The movable part 30 is capable of moving the holding part 60 back and forth in each of a second direction (for example, leftward and rightward directions) that is orthogonal to a first direction (for example, a forward one) where the holding part 60 that holds the connection object 5 is moved therein in order to connect the connection object 5 to the target connector 8, and a rotational direction that is a direction where the holding part 60 is rotated therein around an axis along a third direction (for example, upward and downward directions) that is orthogonal to each of the first direction and the second direction as a center. The pressing part 40 presses the movable part 30 that moves in the second direction to move the movable part 30 to a neutral position in the second direction and presses the movable part 30 that moves in the rotational direction to move the movable part 30 to a neutral position in the rotational direction. Thereby, even in a case where there is an error in alignment in at least one of a second direction and a rotational direction, it is possible to correct an error in alignment accurately.

Furthermore, the movable part 30 includes the slide part 31 that is capable of moving back and forth in the second direction, and the rotation part 32 that is capable of moving back and forth in the rotational direction. The pressing part 40 includes the first pressing part 41 that presses the slide part 31 that moves in the second direction to move the slide part 31 to a neutral position in the second direction, and the second pressing part 42 that presses the rotation part 32 that moves in the rotational direction to move the rotation part 32 to a neutral position in the rotational direction.

Furthermore, the pressing part 40 is composed of a plurality of magnets or a plurality of elastic bodies. Thereby, it is possible to provide the pressing part 40 with a simple configuration. Furthermore, the connection object 5 is an electrical connector or a plate-shaped wiring member.

Furthermore, the connection jig 4 according to an embodiment includes the position correction part 10 and the holding part 60. Then, the position correction part 10 is arranged at a position that is shifted from that of the holding part 60 in the first direction. Thus, a position of the holding part 60 is shifted in the first direction relative to the position correction part 10, so that, for example, it is possible to reduce a possibility that the cable part 6 that is connected to the connection object 5 contacts the arm 1c due to an operation of the arm 1c.

Furthermore, the connection jig 4 includes the position correction part 10, the holding part 60, and the detection part 80. The detection part 80 is provided between the position correction part 10 and the holding part 60 and detects whether or not an amount of movement of the holding part 60 in at least one of the second direction and the rotational direction that is executed by the position correction part 10 is insufficient when the connection object 5 is connected to the target connector 8. Thereby, for example, it is possible to readily detect a state where it is not possible to connect the connection object 5 to the target connector 8. Furthermore, in a case where the detection part 80 detects that an amount of movement of the holding part 60 that is executed by the position correction part 10 is insufficient, the control device 2 executes a correction process of correcting stored teaching data, so that it is possible to reduce an error in alignment that is caused by such teaching data.

According to an aspect of an embodiment, it is possible to provide a position correction device, a robot, and a connection jig that are capable of correcting an error in alignment accurately.

It is possible for a person skilled in the art to derive an additional effect or a variation thereof. Hence, a broader aspect of the present invention is not limited to a specific detail and a representative embodiment as illustrated and described above. Therefore, it is possible to apply various modifications thereto without departing from a spirit or scope of a general inventive concept as defined by the appended claim(s) and equivalents thereof.

What is claimed is:

1. A position correction device, comprising:
    a movable part that moves a holding part that holds a connection object back and forth in each of a second direction that is orthogonal to a first direction that is a direction where the holding part is moved therein in order to connect the connection object to a target connector, and a rotational direction that is a direction where the holding part is rotated therein around an axis along a third direction that is orthogonal to each of the first direction and the second direction as a center; and
    a pressing part that presses the movable part that moves in the second direction to move the movable part to a neutral position in the second direction and presses the movable part that moves in the rotational direction to move the movable part to a neutral position in the rotational direction, wherein
    the holding part includes a region that holds the connection object,
    the movable part includes
        a slide part that moves back and forth in the second direction, and
        a rotation part that moves back and forth in the rotational direction, the pressing part includes
        a first pressing part that presses the slide part that moves in the second direction to move the slide part to a neutral position in the second direction, and
        a second pressing part that presses the rotation part that moves in the rotational direction to move the rotation part to a neutral position in the rotational direction, and
    the second pressing part includes a first plurality of magnets that are provided on the rotation part and a second plurality of magnets that are provided on a supporting part that supports the rotation part and face the first plurality of magnets in the rotational direction.

2. The position correction device according to claim 1, wherein the first pressing part includes a plurality of magnets or a plurality of elastic bodies.

3. The position correction device according to claim 1, wherein the connection object is an electrical connector or a plate-shaped wiring member.

4. The position correction device according to claim 1, wherein
    the slide part includes a slide body arranged between guide parts connected to a lower surface of a base plate, and a supporting part that is fixed on a bottom of the slide body and supports the rotation part via a bearing,
    the slide body includes a base part and a pair of rails fixed on the base part and held by the guide parts, and
    the supporting part includes a first cylinder part with a first flange on a top thereof, and a second cylinder part with a second flange on a bottom thereof, the bearing being interposed between the first flange and the second flange.

5. The position correction device according to claim 4, where
    the rotation part includes a cover and a fixation part,
    the cover includes a cylindrical peripheral wall part, a bottom part that is continuous with a bottom of the peripheral wall part, and recesses formed on a top of the bottom part, and
    the fixation part includes a circular part and protrusion parts that protrude from the circular parts and cooperate with the recesses.

6. A robot, comprising
    the position correction device according to claim 1 to connect the connection object to the target connector.

7. A connection jig, comprising:
    the position correction device according to claim 1; and
    the holding part,
    wherein the position correction device is arranged at a position that is shifted from that of the holding part in the first direction.

8. A connection jig, comprising:

the position correction device according to claim 1, the holding part; and a detection part that is provided between the position correction device and the holding part and detects whether or not an amount of movement of the holding part in at least one of the second direction and the rotational direction that is executed by the position correction device is insufficient when the connection object is connected to the target connector.

* * * * *